UNITED STATES PATENT OFFICE.

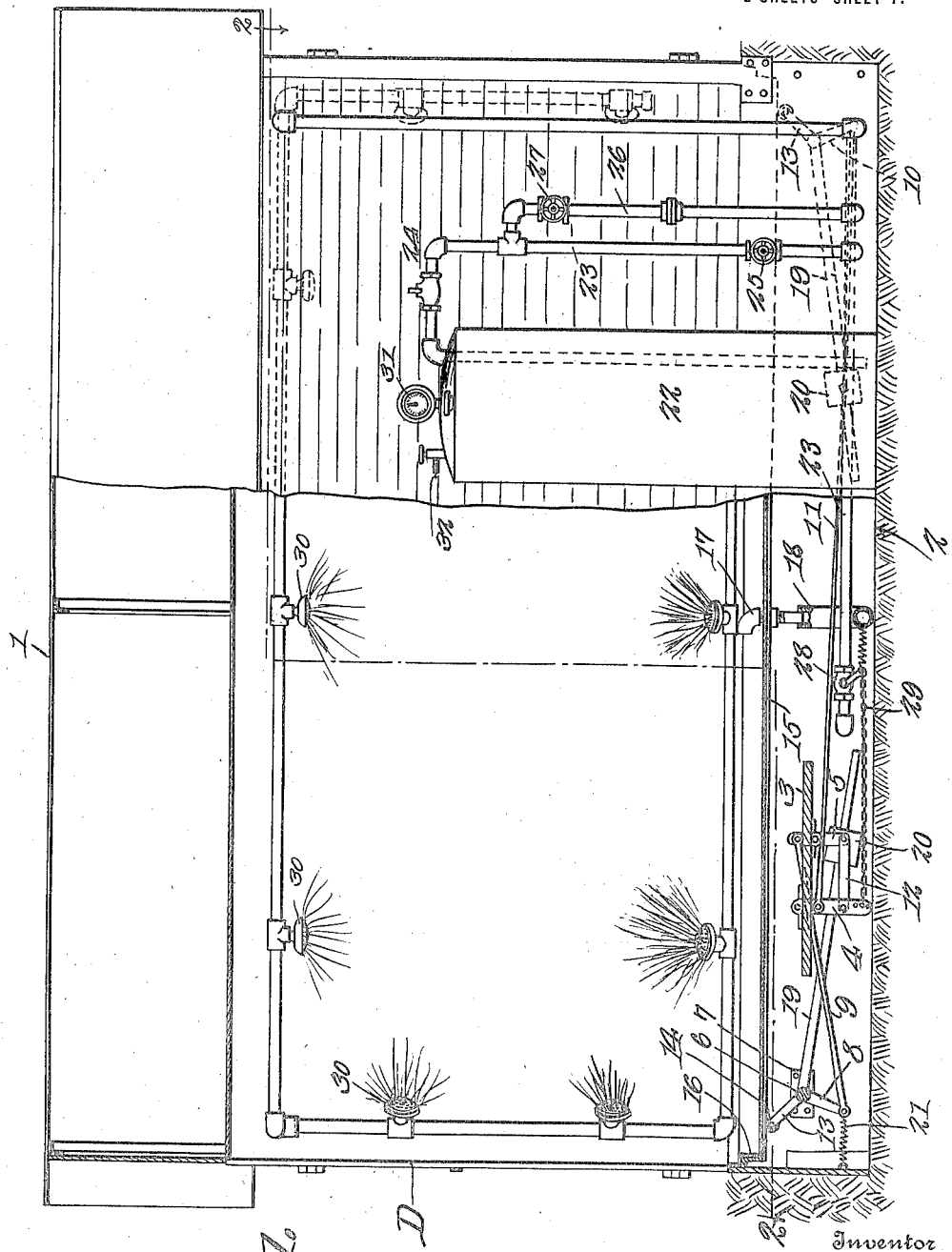

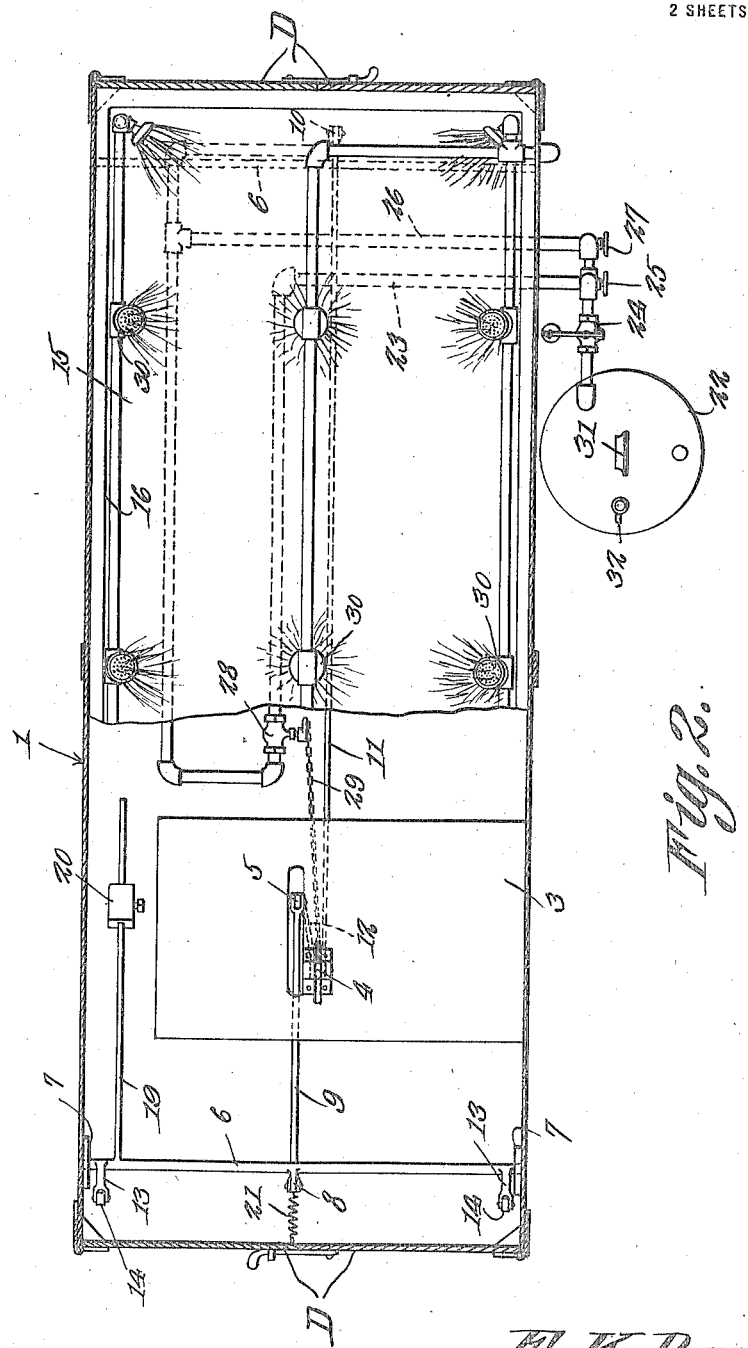

EUGENE K. BARNES, OF MARIETTA, GEORGIA.

SPRAYING APPARATUS.

1,273,311.   Specification of Letters Patent.   Patented July 23, 1918.

Application filed April 22, 1918. Serial No. 230,095.

*To all whom it may concern:*

Be it known that I, EUGENE K. BARNES, a citizen of the United States, residing at Marietta, in the county of Cobb and State of Georgia, have invented a new and useful Spraying Apparatus, of which the following is a specification.

This invention relates to apparatus for use in spraying live stock for the purpose of applying medicinal preparations for use in eradication of tick, and other ailments, in the treatment of hoof diseases, skin diseases, etc. One of the objects of the invention is to provide an inclosure into which the stock is to be driven, the weight of the animal within the inclosure operating to open communication between a supply container and some spraying nozzles so that, by the time the animal passes through the inclosure, it will be drenched with the liquid preparation.

A further object is to provide apparatus in which the contents of the storage tank can be placed under pressure by means of a hand pump or can be compressed by a power pump, as may prove most convenient.

With the foregoing and other objects in view which will appear as the description proceeds, the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings—

Figure 1 is a view partly in side elevation and partly in section of the apparatus constituting the present invention.

Fig. 2 is a horizontal section through the apparatus on the line 2—2, Fig. 1.

Referring to the figures by characters of reference, 1 designates a roofed structure which can be of any construction desired and which is erected over a shallow pit 2. Doors D are provided at the ends of the structure. Extending transversely within the pit is a supporting structure 3 in which are fulcrumed two levers 4 and 5 respectively. The lever 4 is pivotally mounted at its upper end while the lever 5 is pivotally mounted between its ends.

Extending transversely of each end portion of the pit 2 is a shaft 6 journaled in suitable bearings 7, and one of the shafts 6 has an arm 8 depending therefrom and connected by a rod 9 to the upper end of the lever 5. The other shaft 6 has a depending arm 10 connected by a rod 11 to the lever 4. A link 12 connects the two levers as shown. Arms 13 are extended upwardly from the two shafts 6 and are inclined outwardly and upwardly, there being rollers 14 at the upper ends of these arms on which rest the end portions of a platform 15 extending throughout the length and width of the interior of the structure 1 and over the pit 2. This platform has upstanding side and end walls 16 whereby a shallow body of liquid can be retained on the platform. Overflow of this liquid is prevented by an outlet pipe 17 extending through the platform to a desired height and the lower end of which is snugly and slidably mounted in a trap 18 which can conduct the fluid to a container, not shown, from which it can be removed and reused. Arms 19 are extended inwardly from the shafts 6 and carry adjustable weights 20 which serve to hold the platform elevated. This weighted lever can be supplemented by springs 21 connecting the arms 8 to the ends of the pit 2, or, if desired, strong springs 21 can be used without the weighted arms.

Located at any suitable point is a supply tank 22 for holding medicated liquid under pressure. This tank has a distributing pipe in communication therewith, as shown at 23 and said pipe has a valve 24 whereby the supply of liquid thereto from the tank can be shut off. Another valve 25 is located in said pipe and extending from the pipe at a point between the two valves 24 and 25 is a branch pipe 26 having a valve 27. The pipe 23 extends into the pit and is provided with a spring closed valve 28 which is connected by a chain 29 or the like, to the lever 4. Said pipe then extends to the sides, ends and top of the interior of the structure 1 and has spraying nozzles located wherever desired, these nozzles being shown at 30. The branch pipe is connected to a portion of the pipe 23 below the platform 15 and constitutes a by-pass about the valve 28.

Air under pressure is adapted to be forced into the tank 22 in any manner desired, the amount of pressure being determined by the indicator 31. The air inlet has been shown at 32. If the spraying mechanism is to be operated by the animals being treated, the valve 27 is closed while the valves 24 and 25 are opened. The doors D at the ends of the structure are opened and the animal to be treated is driven into the structure. As soon as the weight of the animal is placed on one end of the platform 15, said platform will be depressed slightly. For example if the animal enters at the left end of the structure shown in Fig. 1 the arms 13 on the shaft 6 at said end will be depressed, causing the shaft to rotate and push through arms 8 against the rod 9. Lever 5 will thus be shifted so as to thrust through link 12 upon lever 4 and cause said lever to pull through rod 11 upon the arms 10 and rotate the other shaft 6 so as to allow the other end of the platform to gravitate. This action will open the valve 28 and the liquid under pressure will be directed through the various nozzles and onto the animal which will be thoroughly drenched when it leaves the structure 1. As soon as the weight of the animal is removed from the platform the parts will return to their original positions. Some of the liquid will be retained by the walls of the platform. This will be sufficient to submerge the hoofs of the animal which will thus become saturated. By closing the valve 25, opening the valve 27 and manipulating the valve 24, the discharge of the liquid can be controlled by the attendant. By closing the doors at the end of the structure after an animal has been driven into the structure, the said animal can be sprayed as long as desired.

What is claimed is:—

The combination with a housing having end doors, of a vertically movable platform between the doors and extending throughout the width of the interior of the housing, yielding means for supporting the platform, spraying nozzles arranged within the housing, a liquid supply, means operated by the downward movement of the platform for opening communication between the supply and the nozzles, a stationary trap below the platform, and an overflow pipe movable with the platform and within the trap, said platform having marginal walls.

In testimony that I claim the foregoing as my own, I have hereto affixed my signature in the presence of two witnesses.

EUGENE K. BARNES.

Witnesses:
D. H. COLLINS,
J. E. DOBBS.